United States Patent [19]
Westerdale

[11] 3,942,385
[45] Mar. 9, 1976

[54] ACTUATING MECHANISM FOR IMPARTING OSCILLATORY MOTION TO AN OUTPUT SHAFT

[75] Inventor: Paul A. Westerdale, Riverview, Mich.

[73] Assignee: Ford Motor Company, Dearborn, Mich.

[22] Filed: Sept. 13, 1974

[21] Appl. No.: 505,883

[52] U.S. Cl. .................. 74/70; 74/75; 15/250.17
[51] Int. Cl.² ... F16H 21/40; A47L 1/00; B60S 1/02
[58] Field of Search ... 74/70, 75; 15/250.17, 250.27

[56] References Cited
UNITED STATES PATENTS

| | | | |
|---|---|---|---|
| 2,370,101 | 2/1945 | Whitted | 15/250.17 |
| 2,513,247 | 6/1950 | Morton | 74/70 |
| 2,587,163 | 2/1952 | Jackson | 74/70 |
| 2,651,802 | 9/1953 | Kearful | 15/250.17 |
| 2,753,721 | 7/1956 | Letta | 74/75 |
| 2,768,530 | 10/1956 | Brundage | 74/75 |
| 2,779,199 | 1/1957 | Lincoln et al. | 74/70 |
| 2,959,968 | 11/1960 | Gute et al. | 74/70 |
| 3,262,038 | 7/1966 | Smith | 74/70 |
| 3,282,120 | 11/1966 | Compton | 74/75 |
| 3,362,236 | 1/1968 | Druseikis | 15/250.17 |

*Primary Examiner*—John J. Camby
*Assistant Examiner*—Henry C. Yuen
*Attorney, Agent, or Firm*—John J. Roethel; Keith L. Zerschling

[57] ABSTRACT

An actuating mechanism for imparting oscillatory motion to an output shaft journalled for pivotal movement about a fixed pivot axis. The actuating mechanism is adapted to be driven by a reversible motor means and comprises a power shaft carrying a drive worm, a worm gear in mesh with the drive worm and coupled to a drive shaft, and an articulated crank and link means coupling the drive shaft to the output shaft for translating rotation of the drive shaft into oscillation of the output shaft through an arc of predetermined angular size.

The drive shaft is journalled in a slide means. A guide means supports the slide means for shiftable movement in a direction parallel to the longitudinal axis of the power shaft between first and second positions, the slide means being shiftable from one position to the other upon the direction of rotation of the motor being reversed. The movement of the slide means causes corresponding movement of the drive shaft journalled therein toward or away from the fixed pivot axis of the output shaft thereby to shift the angular position of the arc through which the output shaft is oscillatable.

The actuating mechanism has particular utility in a vehicle windshield wiper system in which a wiper blade is oscillated through a wipe pattern and then shifted to a displaced position for parking in an inoperative position.

10 Claims, 4 Drawing Figures

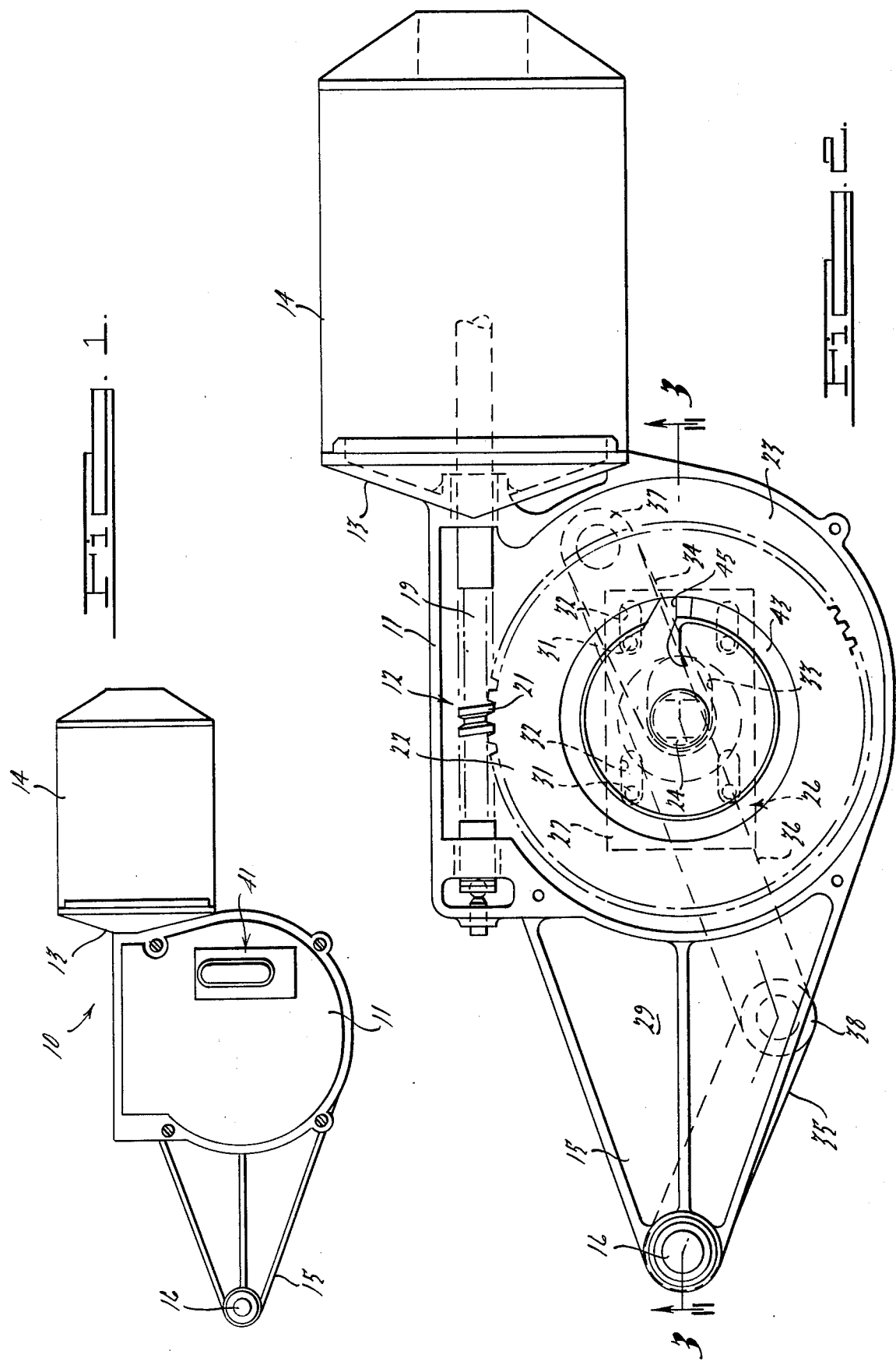

ACTUATING MECHANISM FOR IMPARTING OSCILLATORY MOTION TO AN OUTPUT SHAFT

BACKGROUND OF THE INVENTION

The prior art is replete with actuating mechanisms for imparting oscillatory motion to an output shaft journalled for pivotal movement about a fixed pivot axis. Such mechanisms have particular utility in vehicle windshield wiper systems in which a wiper blade is oscillated through a wipe pattern.

Most windshield wiper mechanisms utilize a rotary crank as part of the linkage between a drive motor and the output shaft. A desirable feature of such systems is the ability to shift the wiper blade to a depressed "Park" position outside of the normal wipe pattern when the wiper mechanism is inoperative. This frequently is accomplished by provision of a means for varying the throw of a rotary crank upon reversal of the direction of rotation of the drive motor coupled to the crank. Rotary movement of the crank is translated into oscillatory movement of the pivot shaft through a suitable linkage system.

Patents that are representative of the prior art include U.S. Pat. No. 2,831,354 issued Apr. 22, 1958 to William A. Schnepf for a "Windshield Wiper Actuating Mechanism." This patent discloses a mechanism utilizing a screw element operatively connected through an automatically disengageable and engageable clutch to the wiper transmission. Through the screw element and clutch, the effective length of the crank may be varied so as to alter the amplitude of oscillation imparted to a driven member.

U.S. Pat. No. 3,091,128 issued May 28, 1963 to D. D. DeReese et al. for a "Windshield Wiper Mechanism" discloses a mechanism wherein the throw of the rotary crank is varied by eccentric means controlled by an electromagnet. U.S. Pat. No. 2,768,530 issued Oct. 30, 1956 to A. D. Brundage for a "Windshield Wiper Drive and Parking Control" discloses a system involving an eccentric operative to increase the effective length of the crank arm upon reverse rotation of a motor shaft, the position of the eccentric being mechanically controlled.

It is an object of the present invention to provide a novel actuating mechanism for imparting oscillatory motion to an output shaft, the mechanism having the capability of shifting the oscillation pattern in direct response to a change in direction of rotation of a drive motor without the use of any type eccentric device for changing the effective length or throw of a rotary crank.

SUMMARY OF THE INVENTION

The present invention comprises an actuating mechanism for imparting oscillatory motion to an output shaft journalled for pivotal movement about a fixed pivot axis. The actuating mechanism is adapted to be driven by a reversible motor means and comprises a power shaft carrying a drive worm, a worm gear in mesh with the drive worm and coupled to a drive shaft, and an articulated crank and link means coupling the drive shaft to the output shaft for translating rotation of the drive shaft into oscillation of the output shaft through an arc of predetermined angular size.

The drive shaft is journalled in a slide means. A guide means supports the slide means for shiftable movement in a direction parallel to the longitudinal axis of the power shaft between first and second positions. The slide means is shiftable from the first position to the second position upon the direction of rotation of the rotor being reversed. The movement of the slide means causes corresponding movement of the drive shaft journalled therein toward or away from the fixed pivot axis of the output shaft thereby to shift the angular position of the arc through which the output shaft is oscillatable.

The actuating mechanism has particular utility in a vehicle windshield wiper system in which a wiper blade is oscillated through a wipe pattern and then shifted to a displaced position along the wiping pattern arc for parking in an inoperative position.

DESCRIPTION OF THE DRAWING

Further features and advantages of the present invention will be made more apparent as this description proceeds, reference being had to the accompanying drawings, wherein:

FIG. 1 is a plan view of a windshield wiper motor assembly embodying the actuating mechanism of the present invention;

FIG. 2 is an enlarged view of the windshield wiper motor assembly with the cover plate removed to show the actuating mechanism;

DETAILED DESCRIPTION OF THE INVENTION

Figure 3:
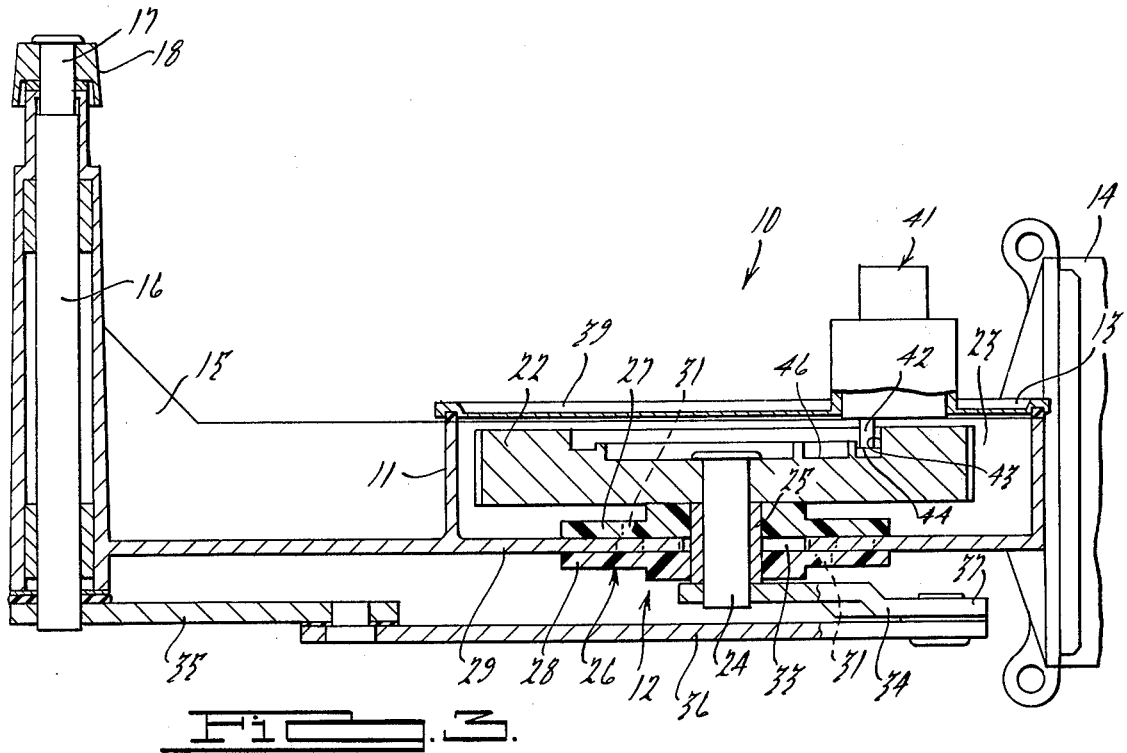
FIG. 3 is a section view on the line 3—3 of FIG. 2.

Referring now to the drawings, there is shown in FIG. 1 the general orientation of a windshield wiper drive unit designated 10. The windshield wiper drive unit 10 comprises a housing 11 containing the novel actuating mechanism, generally designated 12, embodying the present invention. Adapted to be supported at one end 13 of the housing 11 is a reversible electric motor 14. At its other end 15 the housing journals a shaft 16 adapted to receive at its upper end 17 a windshield wiper blade support arm 18 (see FIG. 3).

The reversible motor 14 is coupled to a power shaft 19 extending into the housing and carrying a drive worm 21. The drive worm 21 is in mesh with a worm gear 22 contained within an enlarged chamber 23 in the housing 11. As best seen in FIG. 3, the worm gear 22 is carried on a drive shaft 24 journalled in a bushing 25 carried on a slide means 26. The slide means 26 comprises, preferably, two plastic plates 27–28 of generally rectangular shape that are riveted or pinned together on opposite sides of a base plate portion 29 of the housing 11 extending lengthwise of the latter. The rivets or pins 31 holding the plates 27–28 extend through elongated slots 32 extending parallel to the longitudinal axis of the motor shaft 19.

The bushing 25 and drive shaft 24 journalled therein also extend through an elongated slot 33 and the base plate 29. The worm gear 22 is thus supported for movement in a direction parallel to the longitudinal axis of the power shaft 19. Stated another way, the pivot axis of the shaft 24 supporting the worm gear 22 is linearly movable toward and from the fixed pivot axis of the windshield wiper blade support shaft 16, the line of movement being parallel to the longitudinal axis of the power shaft 19.

An articulated link and crank means provides a driving connection between the drive shaft 24 and the wiper blade supporting shaft 16. The articulated link and crank means comprises a first crank arm 34 fixed to the lower end of the drive shaft 24 and a second crank arm 35 fixed to the lower end of the wiper blade supporting shaft 16. The two crank arms are operatively coupled to each other by an elongated link 36 pivotally connected at each of its ends to a respective crank arm.

Figure 4:
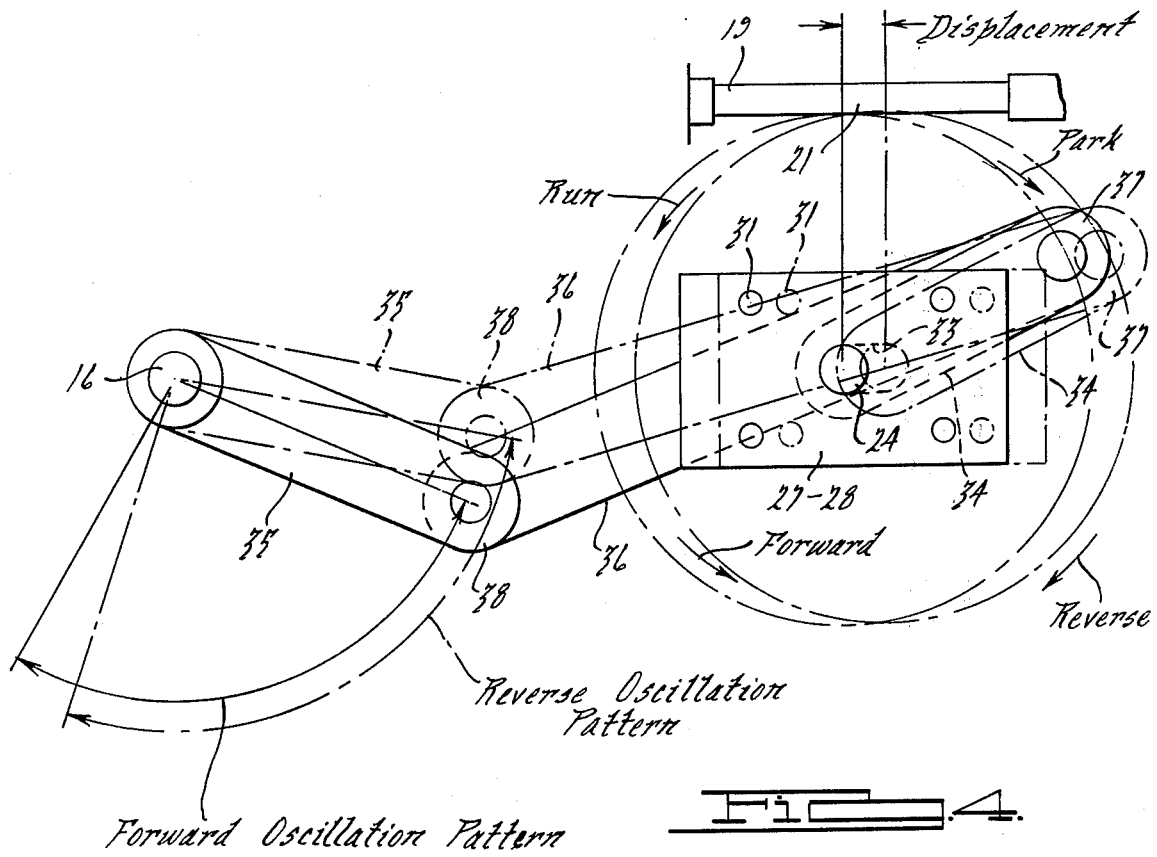
FIG. 4 is a diagrammatic view illustrating the shift in the oscillation pattern achieved when the direction of rotation of the drive motor is reversed.

FIG. 4 is a schematic representation of the actuating mechanism 12 as described to this point. With reference to this diagram, the operation of the mechanism is as follows:

In the forward or normal direction of rotation of the reversible electric motor 14, the drive worm 21 drives the worm gear 22 in a counterclockwise direction, as shown in solid outline and labeled as the "Forward" direction. In a windshield wiper application of the mechanism, this is labeled the "Run" mode.

The meshing engagement between the drive worm and worm gear creates not only a force couple causing rotation of the worm gear in the forward or run direction but also a force component acting through the center of the driveshaft 24 urging the worm gear 22, drive shaft 24 and slide means 26 assembly to the left, as viewed in FIG. 4, along a line parallel to the longitudinal axis of the power shaft 19. The relationship of the pins securing the plates 27–28 of the slide means 26 to each other in the slots 32 and the drive shaft 24 in the slot 33 determines the final position of the center of the drive shaft 24. The location of drive shaft 24 determines the rotation circle of the free end 37 of the crank arm 34. This in turn determines the forward oscillation or run pattern of the crank arm 35 connected to the wiper blade supporting shaft, as shown in solid outline at the left side of FIG. 4.

If the direction of rotation of the reversible motor is reversed, the drive worm 24 will drive the worm gear 22 in a clockwise direction, as shown in dot and dash outline in FIG. 4 and labeled as the "Reverse" direction. (In a windshield wiper application, this is labeled as the "Park" mode.) As the direction of rotation of the worm gear 22 is reversed, the reaction forces between the drive worm 21 and the worm gear 22 causes the latter to tend to walk longitudinally of the power shaft 19 from left to right. This is permitted by the slide means 26 which carries the drive shaft 24 in a direction parallel to the power shaft 19 longitudinal axis. This left-to-right movement continues until the pins 31 abut the right ends of the slots 32 and the shaft 24 abuts the right end of slot 33. This displacement is labeled as such in FIG. 4. This causes the free end 37 of the crank arm 34 to be shifted away from the fixed pivot axis of the shaft 16. The free end 38 of crank 35 is upwardly displaced causing a shift in the oscillation pattern. There is no substantial change in the arc length or angular size of the oscillatory movement, but the reverse oscillation pattern is shifted from the forward oscillation pattern to the extent shown in FIG. 4.

In the application of the actuating mechanism 12 to a windshield wiper unit, the displacement of the oscillation pattern in a reverse direction of rotation of the power shaft 19 may be utilized to place or Park the windshield wiper blades below the lowermost position at one end of the normal wipe pattern.

As best seen in FIG. 3, the housing 11 has a cover plate 39 covering the chamber 23 containing the worm gear 22. Mounted on the cover 39 is a switch unit 41 and a depending switch element 42. The switch element 42 projects downwardly into a circular groove 43 in a face 44 of the worm gear 22 where it rides on the base surface 44 of the groove when the worm gear is in the forward or run position. Upon the worm gear 22 having its direction of rotation reversed, the switch element moves relatively laterally of the groove 43 through a gate 45 into the deeper centrally recessed portion 46 of the worm gear 22 causing the switch element 42 to move to an open circuit position.

The present invention does not include the electrical circuitry for controlling the operation of the reversible motor. A number of such systems are disclosed in the prior art. As noted in U.S. Pat. No. 2,959,968 issued Nov. 15, 1960 to L. R. Gute et al. for "Windshield Wiper Actuating Mechanism," a typical control system for the reversible motor would include a manual switch having park, low, and high speed positions, a relay operative reversing switch having an energized position, a de-energized position and an off position, and circuits controlled by the switches. When the manual control switch is in either the low or high speed position, the relay switch is energized and circuits are completed for energizing the motor in the forward direction. When the manual control is moved to the Off or Park position, the relay switch, in the present case the switch 43, is de-energized and completes an energizing circuit for the motor in the reverse direction. The relay operator switch is moved to an Off position when the crank arms, and therefore the wiper blades, arrive at a predetermined position. That is, when the wiper blades arrive at the Park position, the motor is de-energized.

It is to be understood this invention is not limited to the exact construction illustrated and described above, but that various changes and modifications may be made without departing from the spirit and scope of the invention as defined by the following claims.

I claim:

1. An actuating mechanism for imparting oscillatory motion to an output shaft journalled for pivotal movement about a fixed pivot axis, the actuating mechanism including a power shaft adapted to be driven by a reversible motor means, the power shaft carrying a drive worm, a worm gear in mesh with the drive worm and coupled to a drive shaft, articulated crank and link means having components of fixed length, the crank and link means coupling the drive shaft to the output shaft for translating rotation of the drive shaft into oscillation of the output shaft through an arc of fixed length, a slide means journalling the the drive shaft, and guide means supporting the slide means for shiftable movement in a direction parallel to the axis of rotation of the power shaft, the slide means being self-positioning in a first or second position on said guide means in response to the direction of rotation of the worm gear, the drive shaft journalled in the slide means being positioned by the latter closer to the fixed pivot axis of the output shaft in the first position of the guide means than in the second position of the latter to bodily displace the angular position of the fixed length arc through which the output shaft is oscillatable.

2. An actuating mechanism according to claim 1, in which:

the articulated crank and link means comprises:

a first crank coupled to the output shaft and a second crank coupled to the drive shaft, and link means extending between the two cranks.

3. An actuating mechanism according to claim 2, in which:

the slide means comprises plate members slidably supported on a plate portion of a housing containing the actuating mechanism, the plate members and plate portion having coacting stop means limiting the movement of the plate members and thereby the placement of the drive shaft relative to the output shaft.

4. An actuating mechanism according to claim 1, in which:

the slide means comprises plate members slidably supported on a plate portion of a housing containing the actuating mechanism, the plate members and plate portion having coacting stop means limiting the movement of the plate members and thereby the placement of the drive shaft relative to the output shaft.

5. An acutating mechanism for driving an output shaft mounted for rotary oscillation about a fixed axis, the actuating mechanism comprising a housing, a drive shaft, a slidable means journalling the drive shaft for rotation about an axis parallel to the fixed axis of the output shaft, the slidable means comprising slide members, guide means supporting the slidable members on a plate portion of the housing for linear shiftable movement between a first and a second position toward or from the fixed pivot axis of the output shaft, linked crank means coupling the output shaft to the drive shaft constructed and arranged so that rotation of the drive shaft causes rotary oscillation of the output shaft through an arc of fixed length, a worm gear coupled to the drive shaft having meshing engagement with a drive worm, the drive worm being mounted for rotation on a worm shaft the axis of which parallels the line of movement of the slidable means, reversible motor means coupled to the drive worm for rotating the latter in either direction, the reaction force between the drive worm and the worm gear during rotation having a force component causing the slidable means to shift axially of the worm shaft toward or from the fixed pivot axis of the output shaft, depending on the direction of rotation of the reversible motor, the slide members and plate portion having coacting stop means limiting the movement of the slide members toward or from the fixed pivot axis of the output shaft, the shift of the slide means and thereby of the drive shaft causing displacement of the fixed length arc through which the output shaft is oscillatable.

6. An actuating mechanism according to claim 5, in which:

the linked crank means comprises a first crank coupled to the output shaft and a second crank coupled to the drive shaft, and link means extending between the two cranks.

7. A windshield wiper actuating mechanism for oscillating a windshield wiper blade supporting shaft, the actuating mechanism being adapted to be driven by a reversible motor means and comprising a housing, the motor means being coupled to a power shaft extending into the housing and carrying a drive worm, a worm gear carried on a drive shaft and in mesh with the drive worm, articulated crank and link means providing a driving connection between the drive shaft and the wiper blade supporting shaft for imparting oscillatory movement to the latter to move a wiper blade mounted thereon through a wiping pattern arc of predetermined size, a slide means journalling the drive means, and guide means supporting the slide means for shiftable movement in a direction parallel to the longitudinal axis of the power shaft between a first and a second position, the slide means when in the first position maintaining a drive shaft and wiper blade mounting shaft relationship in which the articulated crank and link means is adapted to drive the wiper blade over a wipe pattern of predetermined length on a windshield, the slide means when shifted to the second position shifting the drive shaft relative to the wiper blade shaft and causing the articulated crank and link means to displace the wipe pattern without changing the length thereof, the slide means position being determined by the direction of application of the reaction force between the drive worm and worm gear resulting from the direction of rotation of the rotatable motor.

8. A windshield wiper actuating mechanism according to claim 7, in which:

the articulated crank and link means comprises a first crank coupled to the wiper blade supporting shaft, a second crank coupled to the drive shaft, and fixed length link means extending between the two cranks.

9. A windshield wiper actuating mechanism according to claim 8, in which:

the slide means comprises plate members slidably supported on a plate portion of the housing, the plate members and plate portion having coacting stop means limiting the movement of the plate members relative to the wiper blade supporting shaft.

10. A windshield wiper actuating mechanism according to claim 7, in which:

the slide means comprises plate members slidably supported on a plate portion of the housing, the plate members and plate portion having coacting stop means limiting the movement of the plate members relative to the wiper blade supporting shaft.

* * * * *